April 13, 1937. W. NOBLE 2,076,665
COMPOSITE VALVE AND METHOD OF MAKING THE SAME
Filed Feb. 28, 1934
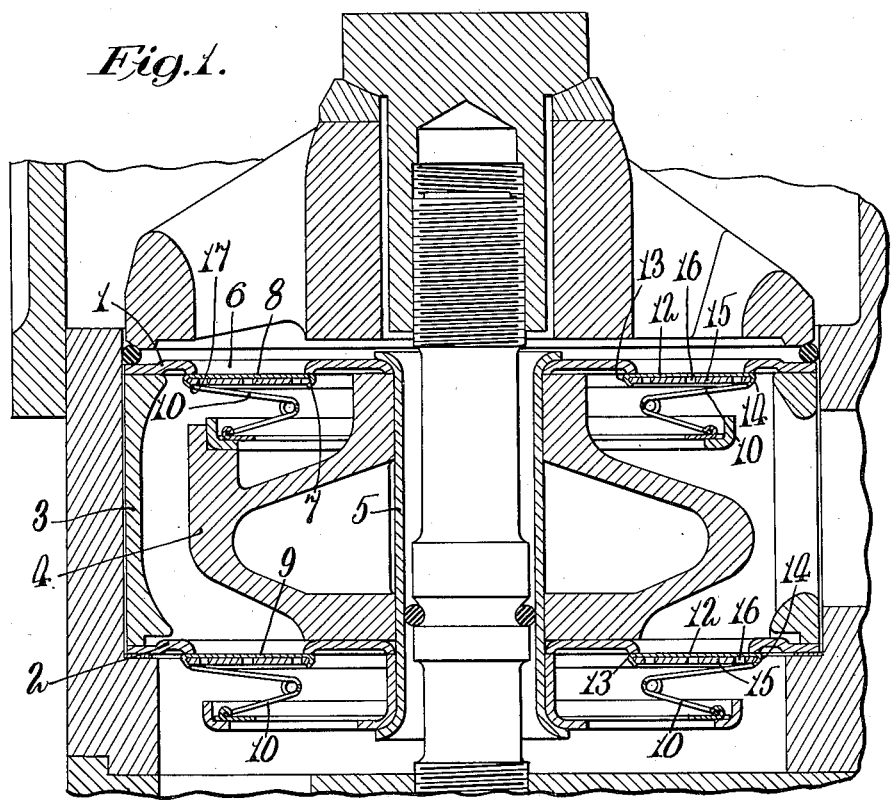
Fig.1.
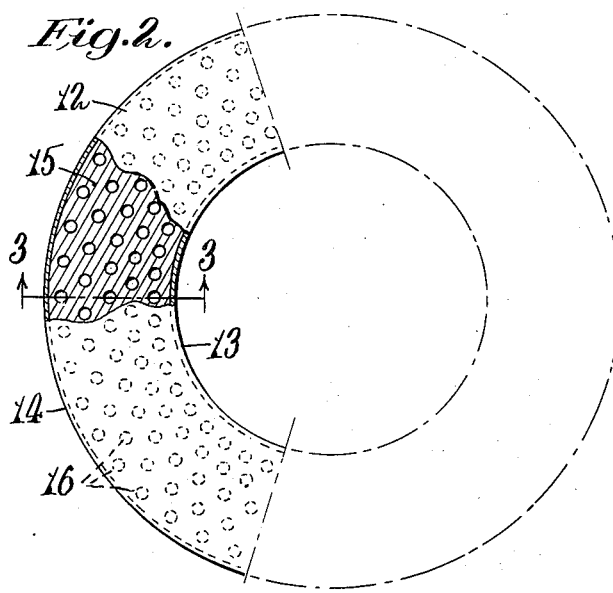
Fig.2.
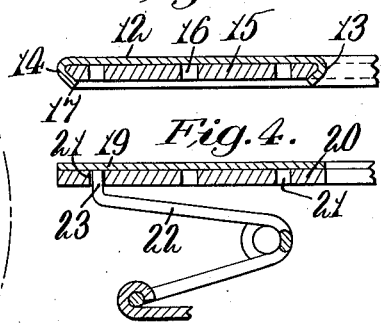
Fig.3.
Fig.4.
Inventor:
Warren Noble.
by Louis A. Maxson
Atty.

Patented Apr. 13, 1937

2,076,665

UNITED STATES PATENT OFFICE 2,076,665

COMPOSITE VALVE AND METHOD OF MAKING THE SAME

Warren Noble, Michigan City, Ind., assignor to Sullivan Machinery Company, a corporation of Massachusetts Application February 28, 1934, Serial No. 713,336

7 Claims. (Cl. 29—157.1)

This invention relates to valve mechanisms, and more particularly to improvements in the valve element of such a mechanism and an improved method of forming the valve element.

Heretofore, in forming the valve elements of valve mechanisms of a certain character, particularly in forming valve elements of the flat sheet metal disc type, the valve element was formed by a cold process, stamped out, and its peripheral edge spun over to provide a valve spring engaging flange. It was found that in the forming process internal stresses were set up and portions sprung, so that the valve element would not seat uniformly, and, due to such internal stresses, breakage would frequently occur. Moreover, it was exceedingly difficult to provide a valve element which was substantially flat, so that a uniform and tight contact of the valve element with its seat would not be possible, due to the relative thinness of the valve, a necessity with the view to obtaining lightness.

A primary object of the present invention is to provide a valve element overcoming, to a great extent, the disadvantages above set forth. Another object is to provide an improved valve element of composite construction, whereby flatness and rigidity are attained while still retaining the desired characteristic of lightness. Still another object is to provide an improved composite valve element of the flat disc type, whereby, due to its construction, rigidity is attained, and flatness, resulting in uniform engagement of the valve element with its seat. Yet another object is to provide an improved composite valve structure, whereby lightness with rigidity is attained. A still further object is to provide an improved method of forming a valve element having the above characteristics. These and other objects and advantages of the invention will, however, hereinafter more fully appear.

In the accompanying drawing there is shown for purposes of illustration one form and a modification thereof, which the invention may assume in practice.

In this drawing:—

Fig. 1 is a sectional view showing a valve mechanism having incorporated therein an illustrative form of the improved valve element.

Fig. 2 is a plan view, with a portion broken away to show structural details, of the improved valve element.

Fig. 3 is a cross sectional view taken on line 3—3 of Fig. 2.

Fig. 4 is a detail sectional view showing a modified form of valve element.

In this illustrative embodiment of the invention, the improved valve element is shown incorporated in a valve mechanism of the same general character as that in my copending application, Serial No. 713,331, filed February 28, 1934, although it will be evident that the improved valve element may be embodied in valve mechanisms of various other types. The valve mechanism shown generally comprises an inlet valve seat 1, a discharge valve seat 2, an intermediate distance piece 3 and a filler ring 4, these elements being held in assembled relation as a unit by means of a central retainer tube 5. As shown, the valve seats 1 and 2 are identical and are provided with a series of circular flow openings 6, surrounded by annular valve seating surfaces 7. Seated on the seating surfaces surrounding the openings 6 in the valve seat members are the improved valve elements 8 and 9, the element 8 constituting the inlet valve and the element 9 the discharge valve. These valve elements are yieldably maintained in their seated position by means of springs 10 similar to those disclosed in the application mentioned above, and mounted in a similar manner.

Now referring to the improved valve elements per se, it will be noted that the inlet and discharge valve elements are identical in design and each comprises, as shown in Figs. 2 and 3, a flat metal disc 12, preferably composed of stainless steel or metals having similar characteristics, and in this instance coated on its inner face with a relatively hard metal of a suitable nature, such as "stellite". This valve disc is stamped with a central opening and the inner and outer peripheral edges, 13 and 14, thereof, are spun or rolled over, for a purpose presently to appear. Contacting with the outer face of the valve disc 12 is a flat, annular reenforcing plate 15, preferably composed of aluminum or a similar metal, and perforated by numerous openings 16 to obtain lightness. The outer plate 15 is rigidly united with the valve disc as by spot welding, or cemented in place with rubber cement or similar adhesive material. The edges of the valve disc are spun, as above mentioned, and engage the peripheral edges of the outer plate 15, and the edge 14 of the valve disc projects slightly from the outer face of the plate 15, for engagement with the spring elements 10 of the valve mechanism above disclosed, in a manner disclosed in my copending application above mentioned. This projecting edge is indicated at 17 and the spring elements engage the same for properly centering the valve element with respect to its seat.

In the modified form of construction shown in Fig. 4, the inner valve element is in the form of a flat metal disc 19, preferably composed of aluminum, and stamped out with a center opening, and secured to the outer face of this disc is a re-enforcing plate 20, likewise composed of aluminum, similar to the plate 15 heretofore described, and united to the valve disc in a similar manner. This plate 20 is perforated by numerous openings 21. In this instance the valve element is held seated by springs 22, similar in design to the springs 10, but provided with bent ends 23, inserted in certain of the openings 21 for positioning the springs with respect to the valve element.

It will thus be seen that by provision of the relatively thin, flat valve disc it is possible to stamp out the valve element by a cold process while maintaining the desired flatness, so that the disc valve, when seated, uniformly engages its seating surfaces, and whereby, by uniting the outer re-enforcing plate to the valve disc, thickness is attained, resulting in rigidity while maintaining the desired lightness. It will further be evident that an improved valve element is provided which is relatively simple and rugged in design, having relatively great wearing qualities and improved action. These and other uses and advantages of the improved valve structure will be fully apparent to those skilled in the art.

While there are in this application specifically described one form and a modification thereof which the invention may assume in practice, it will be understood that this form and the modification thereof are shown for purposes of illustration, and that the invention may be further modified and embodied in various other forms without departing from its spirit or the scope of the appended claims.

What I claim as new and desire to secure by Letters Patent is:—

1. A composite valve element comprising a relatively thin metal valve plate providing seat-engaging portions surrounding port closure portions, and a relatively thick outer re-enforcing plate fixed to said valve plate and foraminated at its portions overlying the port closure portions of said valve plate, to reduce its weight.

2. A composite valve element comprising a relatively thin metal valve plate providing seat-engaging portions surrounding port closure portions, and a relatively thick outer re-enforcing plate of a metal of lower specific gravity than said valve plate fixed to said valve plate and foraminated at its portions overlying the port closure portions of said valve plate, to reduce its weight.

3. A composite valve element comprising a relatively thin wear resistant metal valve plate imperforate between its edges and a relatively thick metal re-enforcing plate, perforated by numerous openings and fixed to said thin metal plate.

4. In a valve mechanism of the type in which a spring both seats and positions its associated valve, a composite valve element comprising a relatively thin metal valve plate and a relatively thick, relatively rigid re-enforcing plate secured together with the outer edge of said valve plate spun over the outer periphery of said re-enforcing plate and providing a circular peripheral spring-engaging ledge on the back of the valve.

5. The method of forming a valve, comprising stamping out a metal valve disc, placing an outer metal re-enforcing plate against the outer face of said metal disc, and yieldably cementing the disc and plate together.

6. The method of forming a valve, comprising stamping out a metal valve disc having an opening therethrough, placing an outer metal re-enforcing plate also having an opening therethrough against the outer face of said metal disc, permanently securing the disc and plate together, and thereafter rolling the inner and outer edges of the metal disc about the inner and outer edges of the re-enforcing plate.

7. The method of forming a valve, comprising stamping out a metal valve disc, placing an outer metal re-enforcing plate against the outer face of said metal disc, cementing the disc and plate together, and thereafter rolling an edge of the metal disc about the peripheral edge of the re-enforcing plate.

WARREN NOBLE.